(12) United States Patent
Wong

(10) Patent No.: US 6,616,076 B2
(45) Date of Patent: Sep. 9, 2003

(54) SPICE CRUSHER

(76) Inventor: Yan Kwong Wong, Unit 1016-17, 10/F, Metro Centre II, Lam Hing Street, Kowloon Bay, Kowloon (HK)

( * ) Notice: Subject to any disclaimer, the term of this patent is extended or adjusted under 35 U.S.C. 154(b) by 0 days.

(21) Appl. No.: 10/219,646

(22) Filed: Aug. 15, 2002

(65) Prior Publication Data
US 2003/0034411 A1 Feb. 20, 2003

(30) Foreign Application Priority Data
Aug. 16, 2001 (CN) ......................................... 01233473 U

(51) Int. Cl.[7] .............................................. B02C 19/12
(52) U.S. Cl. ..................................... 241/168; 241/169.1
(58) Field of Search ............................. 241/168, 169.1, 241/DIG. 17, 285.3

(56) References Cited

U.S. PATENT DOCUMENTS

| | | | | |
|---|---|---|---|---|
| 31,766 A | * | 3/1861 | Rowe | 241/239 |
| 849,741 A | * | 4/1907 | Lewis | 241/602 |
| 2,441,034 A | * | 5/1948 | Pumphrey | 241/280 |
| 4,374,574 A | * | 2/1983 | David | 241/169.1 |
| 4,697,749 A | * | 10/1987 | Holcomb et al. | 241/169 |
| 5,199,655 A | * | 4/1993 | Yang | 241/169 |
| 5,730,374 A | * | 3/1998 | Wu | 241/169 |

* cited by examiner

Primary Examiner—John M. Husar
(74) Attorney, Agent, or Firm—Wyatt, Tarrant & Combs, LLP

(57) ABSTRACT

A spice crusher comprising a main body, a handle pivotally mounted on the main body, a crushing plate, a gear driving mechanism and a fineness control mechanism. The crushing plate, gear driving mechanism and fineness control mechanism are arranged within the main body so that the gear driving mechanism and the fineness control mechanism co-operate with the crushing plate. The driving gear mechanism enables the spice crusher to be operated easily by one hand. The fineness control mechanism controls the fineness of the crushed spices. The spice crusher may be used to crush peppercorns.

10 Claims, 6 Drawing Sheets

SPICE CRUSHER

CROSS-REFERENCE TO RELATED APPLICATIONS

This application claims priority of Chinese Application No. 01233473.1 filed Aug. 16, 2001.

STATEMENT REGARDING FEDERALLY SPONSORED RESEARCH OR DEVELOPMENT

Not Applicable

REFERENCE TO A "MICROFICHE APPENDIX"

Not applicable

FIELD OF THE INVENTION

The invention relates to a spice crusher, particularly to a spice crusher that is able to crush spices, such as peppercorns. Such a spice crusher is often called a peppercorn crusher and more commonly known as a pepper mill.

BACKGROUND OF THE INVENTION

Conventional spice/peppercorn crushers are long cylinders that consist of a cylindrical body and a top cover. These spice/peppercorn crushers require a user to hold the cylindrical body with one hand and apply pressure whilst turning the cover 360° with another hand in order to crush spices or peppercorns contained within the cylindrical body by a crushing plate positioned under the top cover. Such devices require the use of both hands at the same time and significant strength is needed to press and twist the top cover. As a result conventional spice/peppercorn crushers are difficult to use, require much effort and are unsuitable for injured or disabled people. The fineness of the crushed spices/peppercorns is determined by the pressure that is exerted on the top cover by the user's hand. Such a great pressure is required to crush the spices/peppercorns very finely it is difficult to obtain. Also, constant pressure is difficult to maintain and so the fineness of crushed spices/peppercorn is often uneven in the same operation.

SUMMARY OF THE INVENTION

According to a first aspect of the present invention there is provided a spice crusher, comprising a main body, a handle pivotally mounted on the main body, a crushing plate, a gear driving mechanism and a fineness control mechanism, wherein the crushing plate, gear driving mechanism and fineness control mechanism are arranged within the main body such that the gear driving mechanism and the fineness control mechanism co-operate with the crushing plate.

Preferably, the gear driving mechanism comprises a driving gear, a pinion and a large gear, whereby the driving gear is connected to the handle, the pinion and large gear are mounted coaxially and mutually engaged and the large gear works in co-operation with the crushing plate.

Even more preferably, the driving gear is sector-shaped and connected to a cylindrical shaft of the handle.

Preferably, a hollow cylinder is provided within a centre of an upper part of the main body, the pinion and large gear are successively mounted on a cylindrical shaft inserted within a hollow portion of the cylinder and the pinion presses against a spring that forms a sleeve around a periphery of the cylinder.

Additionally, one end face of the pinion may be provided with a plurality of protruding teeth and one end face of the large gear is provided with protruding teeth. The pinion and large gear are arranged so that the protruding teeth of the pinion engage with the protruding teeth of the large gear such that the pinion and large gear rotate together in one direction only.

Likewise, a back of the crushing plate may be provided with a protrusion, the fineness control mechanism comprises a control plate and a knob, one end of the control plate includes an elliptically-shaped hole and an other end includes a protruding portion that engages with the protrusion on the back of the crushing plate, the knob includes a head, a cam-like hard plastic plate, a cylindrical body that is inserted into the elliptically-shaped hole of the control plate and a shaft offset to the cylindrical body that is mounted in a predetermined position on the main body.

Preferably, the handle is provided with a spring bow and a curved piece to return the handle to its initial position after being moved towards the main body.

Additionally, a hard plastic plate with a semi-circular wall may be provided within the main body and arranged so that the spring bow presses against the semi-circular wall.

Even more preferably, a bottom of the hard plastic plate is provided with a plurality of protruding portions that are inserted into corresponding accommodating holes in the main body.

Preferably, a lid is disposed on the top of the main body, the lid has a tail end with a protruding section and swings open when pressure is applied to the protruding section.

In a second aspect of the invention there is provided a peppercorn crusher comprising a main body, a handle pivotally mounted on the main body, a hard plastic plate with a semi-circular wall, a crushing plate, a gear driving mechanism and a fineness control mechanism whereby a lid is disposed on the top of the main body, the handle includes a spring bow and a curved piece, the hard plastic plate is arranged within the main body such that the spring bow presses on the semi-circular wall and the crushing plate, the gear driving mechanism and the fineness control mechanism are arranged within the main body so that the gear driving mechanism co-operates with the crushing plate and the fineness control mechanism links with the crushing plate.

The crushing process of the spice crusher is driven by a gear-driving mechanism. The spice crusher can be operated with only one hand and requires very little strength. A fineness control mechanism is provided so as easily to control the fineness of the crushed spices/peppercorns. The spice crusher of the present invention saves time and labour.

BRIEF DESCRIPTION OF THE DRAWINGS

An embodiment of the present invention is illustrated in the accompanying drawings, by way of example only, in which.

DETAILED DESCRIPTION OF THE PREFERRED EMBODIMENTS

Figure 1:
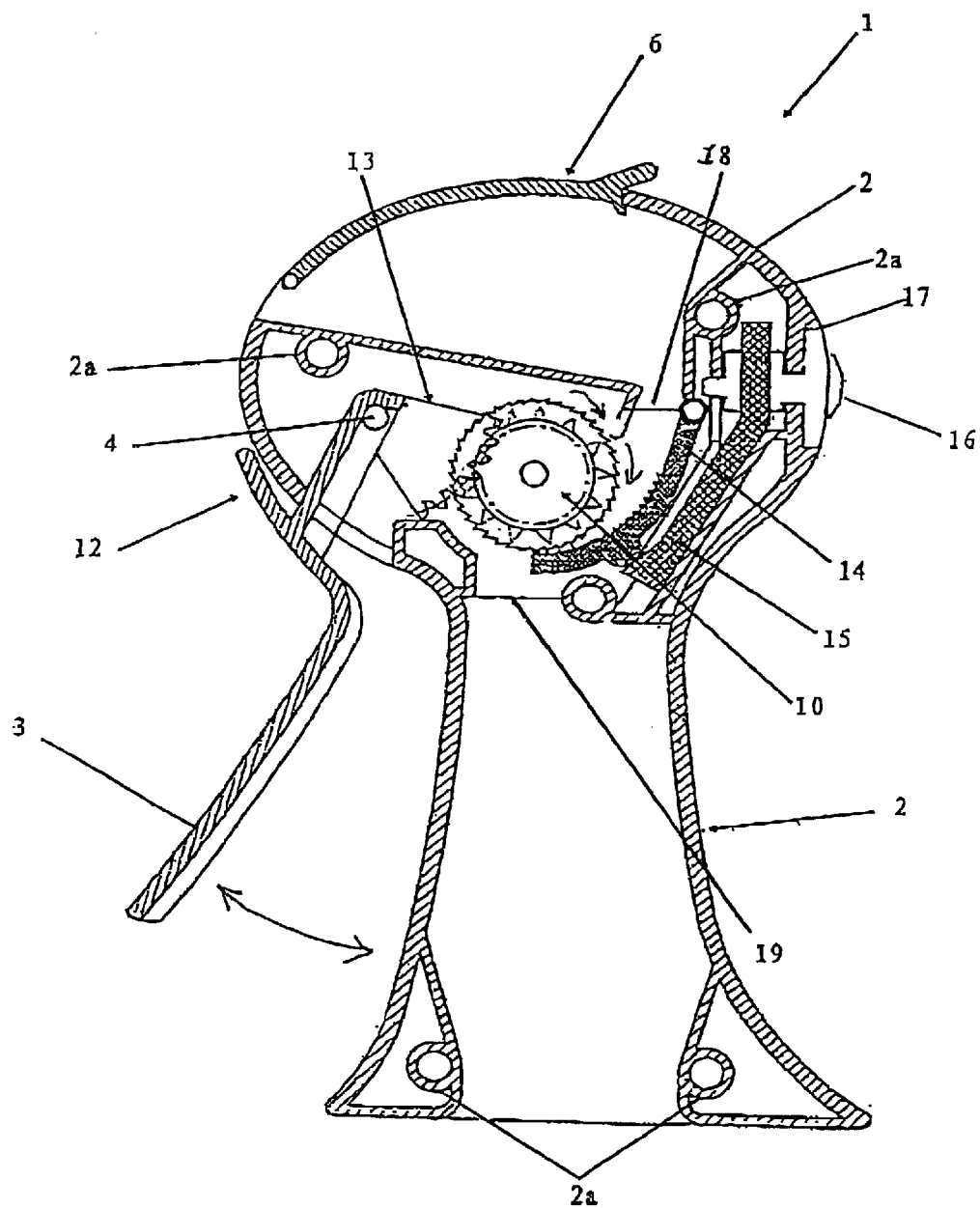
FIG. 1 is a sectional view of a peppercorn crusher of present invention.

FIG. 1 of the accompanying drawings depicts all the requisite parts of a peppercorn crusher 1 according to an embodiment of the present invention. The peppercorn crusher 1 comprises a main body 2 and a handle 3 pivotally mounted on said main body 2. The main body 2 conveniently consists of two identical halves, which are fixed together by means of fasteners such as screws. The peppercorn crusher 1 includes mounting points 2a for installation of the fasteners. The handle 3 has a cylindrical pin 4 passing through its upper end, and two ends of said cylindrical pin 4 are accommodated in a predetermined position in the main body 2 (not shown in the figure), so that the handle 3 is pivotally fixed on the main body 2. In addition, a spring bow 5 is provided on the handle 3, in order to restore the handle 3 back to its initial position after being pulled towards the main body 2.

Figure 5:
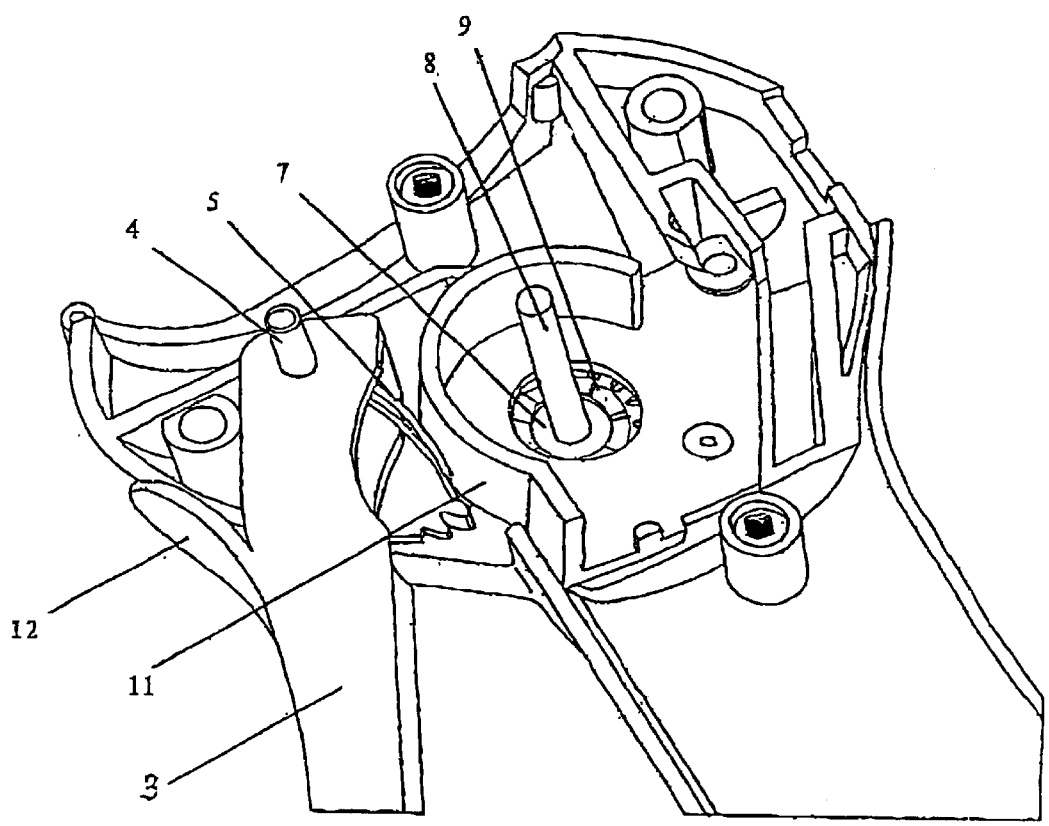
FIG. 5 is a schematic perspective view of a handle and a hard plastic plate of the peppercorn crusher as shown in FIG. 1.

A lid 6 is provided on the top of main body 2 with a swing mechanism. The lid 6 swings upwards to provide an opening in the main body when pressure is applied to the protruding section of a tail end of the lid 6. When the lid 6 is up, an inner chamber 2.1 of the main body 2 may be filled with peppercorns. At a centre of an upper half-part of main body 2 is provided a hollow cylinder 7. A spring 5 acts with a sleeve 11 (hard plastic plate in FIG. 5) around a periphery of the cylinder 7 (not shown) and interacts with handle 3 such that as handle 9 is squeezed to operate the large gear 10, spring 8.1 is tensioned so as to cause handle 9 to return to its regular rest position when released. A cylindrical shaft 8 is inserted into a hollow portion of the cylinder 7. A pinion 9 and large gear 10 are mounted on a cylindrical shaft 8. Two ends of said cylindrical shaft 8 are accommodated in a predetermined position (not shown) in the main body 2.

Figure 2:
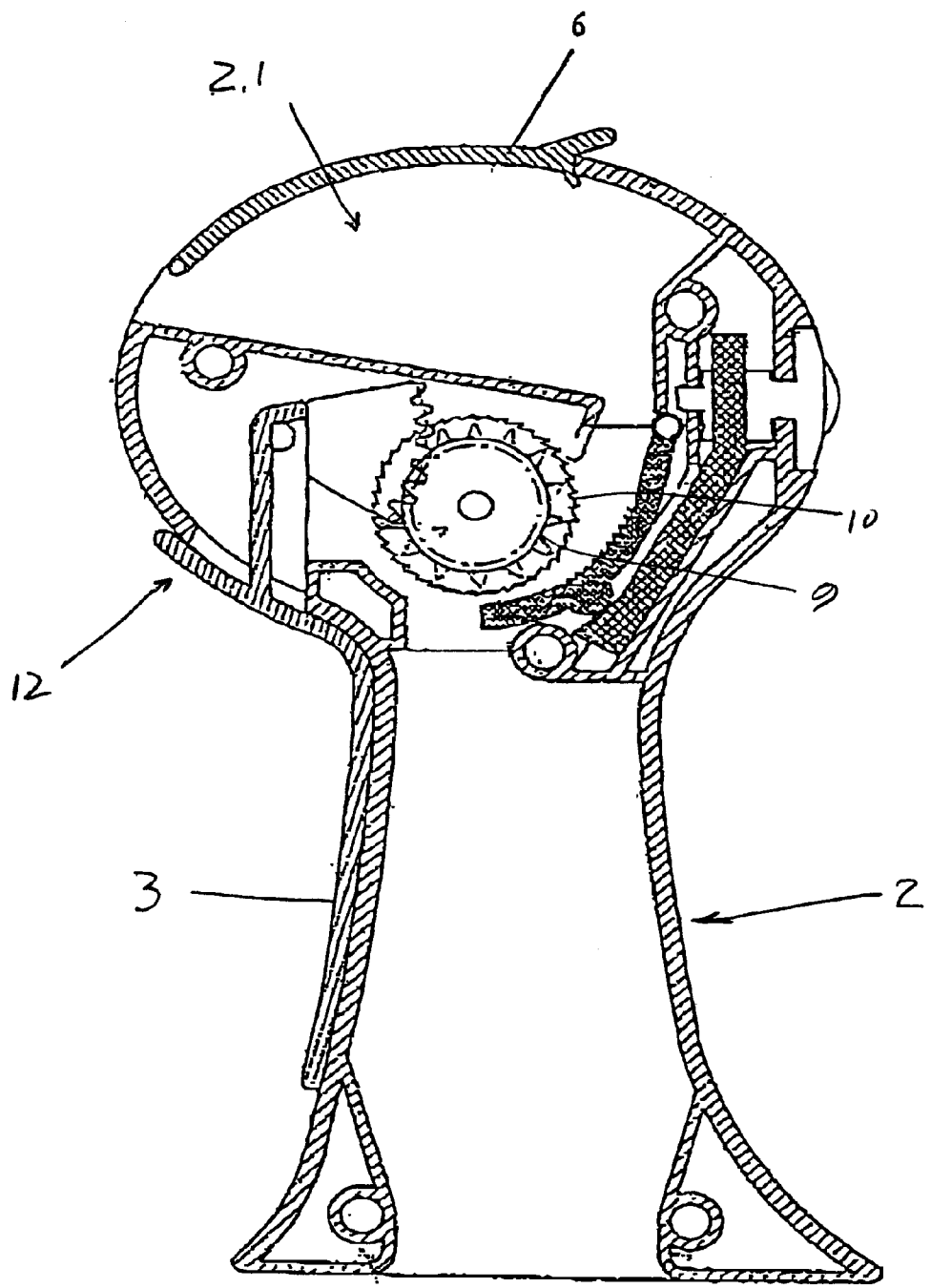
FIG. 2 is a sectional view of the peppercorn crusher as shown in FIG. 1 with a handle pulled towards a main body.
Figure 3:
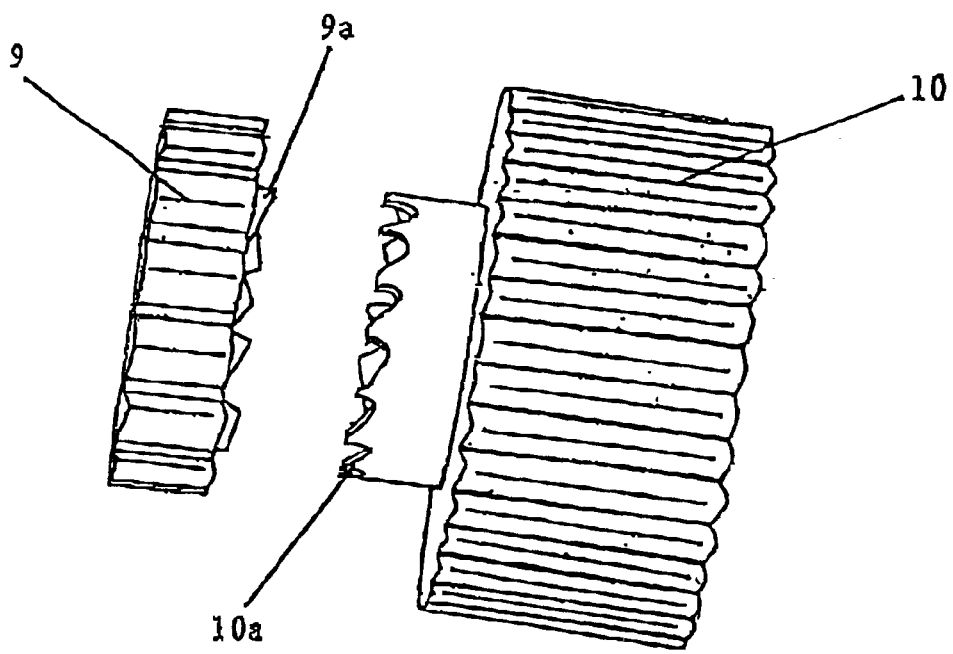
FIG. 3 is a perspective view of a pinion and a large gear of the peppercorn crusher as shown in FIG. 1.

FIG. 3 depicts the pinion 9 and large gear 10 in more detail. The pinion 9 has two end faces, one of which is flat and smooth whilst the other face has a plurality of protruding teeth (FIGS. 1 and 2) with side surfaces inclined substantially at 45°. The pinion 9 may have four protruding teeth. During the assembly of the peppercorn crusher 1 the cylindrical shaft 8 passes through a central hole of the pinion 9. The pinion 9 is arranged so that the face with the protruding teeth is set upwards, while the smooth face abuts the spring that surrounds the periphery of the hollow cylinder 7. As a result the pinion 9 is pressed against the spring 8.1.

As with the pinion 9, one end face of the large gear 10 is flat and smooth whilst the end face of gear 10 is provided with a cylindrical portion, on which is arranged a plurality of protruding teeth. The protruding teeth have, though are not limited to, a substantially inclined side surface of 45°. During assembly, the large gear 10 is mounted on the cylindrical shaft 8 and the cylindrical portion is arranged so that the protruding teeth of the large gear 10 engage with the protruding teeth of the pinion 9.

Due to the particular mating structure of the cylindrical portion of large gear 10 and protruding teeth of pinion 9, the two protruding teeth of the pinion 9 and large gear 10 can only be engaged in one direction. That is to say, when pinion 9 rotates clockwise the protruding teeth of cylindrical portion of large gear 10 and protruding teeth of pinion 9 engage with each other so that pinion 9 drives the large gear 10 to rotate clockwise. But when pinion 9 rotates counter-clockwise, the protruding teeth of pinion 9 slip over the inclined sides of the protruding teeth of the cylindrical portion of large gear 10, and no longer engage. Thus the large gear 10 does not rotate with the counter-clockwise rotation of the pinion and remains stationary.

After the installation of pinion 9, a hard plastic plate 11 with a semi-circular wall is installed. The hard plastic plate 11 may be formed from such as Bakelite®. A plurality of protruding portions are formed on a bottom of the hard plastic plate 11 in order to attach the hard plastic plate 11 to the main body 2. The plurality of protruding portions are inserted into corresponding accommodating holes (not shown) in the main body 2. The hard plastic plate 11 may have three protruding portions. The spring 5 of the handle 3 presses against the semi-circular wall of the hard plastic plate 11. When the handle 3 is pulled towards the main body 2 by the user the outward pushing force of the spring bow 5 causes the handle 3 to return to its original position. In order to prevent the handle 3 from being pushed beyond its original position the handle 3 is provided with a curved piece 12 which abuts the outer wall of the main body 2.

A sector-shaped driving gear 13 is provided at the cylindrical pin 4 end of the handle 3. The sector-shaped driving gear 13 engages the pinion 9. When the user pulls the handle 3 towards the main body, the sector gear 13 swings counter-clockwise. The pinion 9 in turn drives the large gear 10 so that it rotates clockwise. Hence these three gears constitute a gear-driving mechanism. As a result, the user can crush the peppercorns without applying much effort or requiring significant strength.

Figure 6:
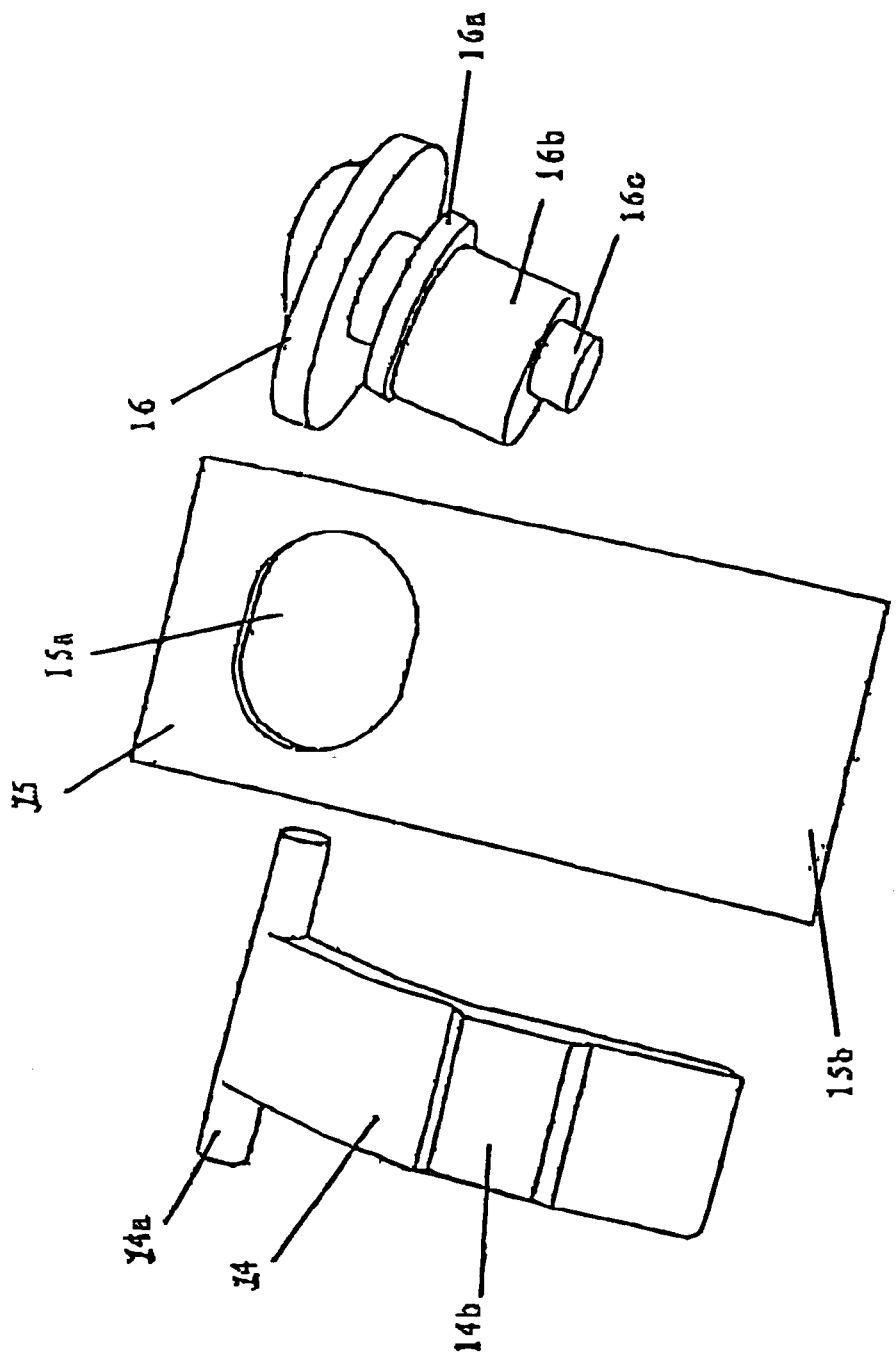
FIG. 6 is an exploded schematic view of a crushing plate, fineness control mechanism and a knob of the peppercorn crusher as shown in FIG. 1.

The main body 2 is also provided with an arc-shaped crushing plate 14 with serrations and a fineness control mechanism. FIG. 6 shows that the fineness control mechanism comprises a fineness control plate 15 to control the fineness of crushed peppercorns and a knob 16 to adjust the control plate 15. Two cylindrical pins 14a are formed integrally at one end of the crushing plate 14. The cylindrical pins 14a are accommodated in predetermined holes in the main body 2 so that the crushing plate 14 can be pivotally fixed. Moreover, a semi-circular protrusion 14b is provided on a back of the crushing plate 14. Serrations are formed on a front face of the crushing plate 14 to press on the large gear 10 in order to crush the peppercorns.

The fineness control plate 15 is generally V-shaped (FIG. 6). An upper end of the control plate 15 is provided with an elliptically shaped hole 15a and a lower end has a protruding portion 15b inclined substantially as at 45°. The protruding portion 15b engages with the semi-circular protrusion 14b formed at the back of the crushing plate 14.

Figure 4:
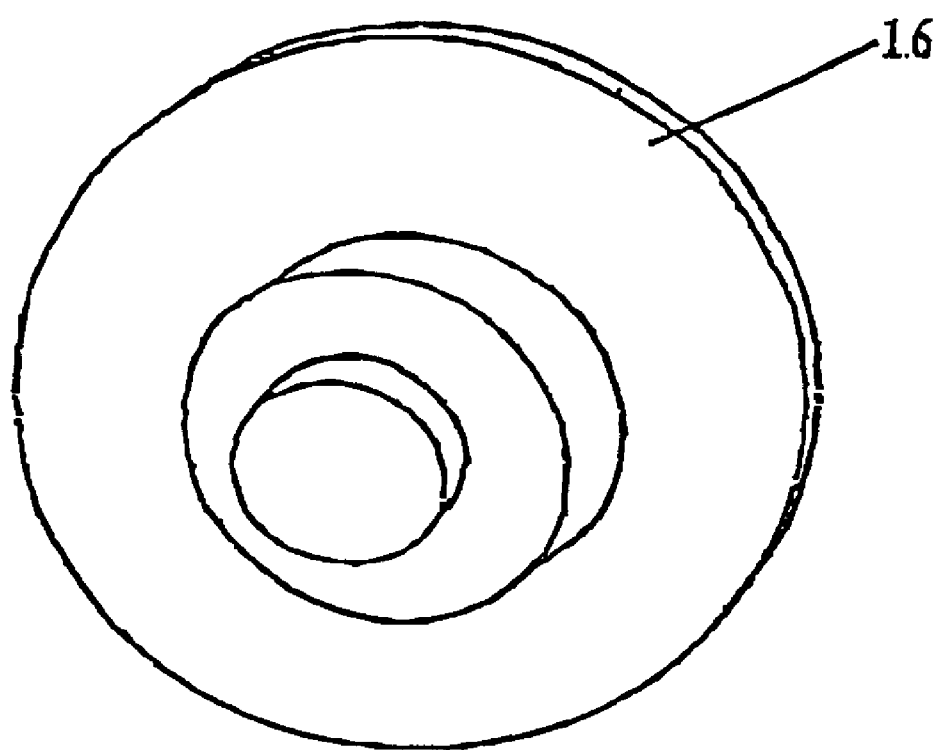
FIG. 4 is a perspective view of a knob to adjust a control plate of the peppercorn crusher as shown in FIG. 1.

FIGS. 4 and 6 depict a configuration of knob 16 in detail. The knob includes a head, a cam-like hard plastic disc 16a, a cylindrical body 16b and an eccentric shaft 16c. The main body 2 is provided with a recess 17 that accommodates the head of the knob 16 so the user may turn it. The hard plastic disc 16a may be formed from Bakelite®. The hard plastic disc 16a limits the rotation of knob by user to a range of such as 5–180° by abutting the inner wall of main body 2. Consequently, excessive turning of the knob is prevented. The cylindrical body 16b is smaller than the elliptical shaped hole 15a in control plate 15. The eccentric shaft 16c is arranged in an offset position to cylindrical body 16b. The cylindrical body 16b is inserted into elliptically shaped hole 15a, and eccentric shaft 16c is installed at a predetermined position in main body 2.

Since the eccentric shaft 16c is offset to one side, when the knob 16 is turned, cylindrical body 16b inserted in the elliptically-shaped hole 15a of control plate 15 is driven to rotate along an elliptical path. As a result the cylindrical body 16b moves closer to either of an upper or a lower end of the elliptically shaped hole 15a so that the control plate 15 is made to ascend or descend. When the knob 16 is turned upward, the cylindrical body 16b inserted in the elliptically shaped hole 15a of control plate 15 moves the control plate 15 upward towards the upper end of elliptically shaped hole 15a. When the control plate 15 is moved upward the protruding portion 15b at lower end of control plate 15 presses against the semi-circular protrusion 14b positioned at the back of the crushing plate 14. The crushing plate is pushed towards the large gear 10 and a gap between crushing plate 14 and large gear 10 becomes smaller so the peppercorn is crushed more finely. Conversely, when knob 16 is turned in a reverse (downwards) direction, the cylindrical body 16b moves the control plate 15 downwards towards the lower end of elliptically shaped hole 15a. By pushing the control plate 15 downwards the protruding portion 15b no longer presses against the semi-circular protrusion 14b at back of crushing plate 14 and so the gap between crushing plate 14 and large gear 10 becomes larger. The pressure acting on the peppercorn lessens and it is crushed more coarsely.

The working principle of the peppercorn crusher shall now be described as follows:

Whilst holding the peppercorn crusher with one hand, the user presses on the protruding part of the tail end of the lid 6 with his thumb in order to swing the lid upwards. The inner chamber of the crusher can now be filled with peppercorns. The peppercorns fall into the gap between crushing plate 14 and large gear 10 through opening 18. The fineness of crushed peppercorn is selected by turning the knob 16. When the user pulls the handle 3 toward main body 2, as shown in FIG. 2, the clockwise pivotal rotation of handle 3 rotates the sector-shaped driving gear 13 counter-clockwise. Thereupon, the sector-shaped driving gear 13 rotates the pinion 9 in a clockwise direction. Since the protruding teeth on pinion 9 are engaged with the protruding teeth on the cylindrical part of the large gear 10, the pinion 9 drives the large gear 10 in a clockwise direction. As a result, the peppercorn within the gap is crushed and falls out through the passage 19. Once the user releases the handle 3, it is restored to its original position through the action of the spring bow 5 and curved piece 12 and at the same time the sector-shaped gear 13 returns in a clockwise direction to its original position. As a consequence, the pinion 9 returns in a counter-clockwise motion to its original position. However, as the pinion 9 returns to its original position it no longer remains engaged with the large gear 10. As the pinion 9 rotates in a counter-clockwise direction the protruding teeth of the pinion 9 slip on the inclined sides of protruding teeth of large gear 10. Hence, the large gear 10 does not rotate with counter-clockwise rotation of pinion 9, but remains stationary so that continuity and a degree of pressure are guaranteed.

It should be appreciated that the above-described peppercorn crusher represents a preferred embodiment of the present invention. Various modifications may be made to this embodiment without departing from the scope of the present invention.

The preferred features of the invention are applicable to all aspects of the invention and may be used in any possible combination.

Throughout the description and claims of this specification, the words "comprise" and "contain" and variations of the words, for example "comprising" and "comprises", mean "including but not limited to", and are not intended to (and do not) exclude other components, integers, moieties, additives or steps.

What is claimed is:

1. A spice crusher, comprising a main body, a handle pivotally mounted on the main body, a crushing plate, a gear driving mechanism and a fineness control mechanism, wherein the crushing plate, gear driving mechanism and fineness control mechanism are disposed within the main body and the gear driving mechanism and the fineness control mechanism co-operate with the crushing plate, said gear driving mechanism comprising a driving gear, a pinion and a large gear, wherein one end face of the larger gear and one end face of the pinion have respective protruding teeth that engage with each other when the pinion is rotated in a first rotational direction, thus causing the large gear to rotate with the pinion in the first rotational direction, and wherein the protruding teeth of the pinion slip over the protruding teeth of the large gear when the pinion is rotated in a second rotational direction opposed to the first rotational direction, thus preventing the large gear from being rotated with the pinion in the second rotational direction.

2. A spice crusher as claimed in claim 1, wherein the driving gear is connected to the handle, the pinion and large gear are mounted coaxially and mutually engaged and the large gear works in cooperation with the crushing plate.

3. A spice crusher as claimed in claim 1, wherein the driving gear is sector-shaped and connected to a cylindrical shaft of the handle.

4. A spice crusher as claimed in claim 1, wherein a hollow cylinder is provided within a centre of an upper part of the main body, whereby the pinion and large gear are successively mounted on a cylindrical shaft inserted within a hollow portion of the cylinder and the pinion presses against a spring that forms a sleeve around a periphery of the cylinder.

5. A spice crusher as claimed in claim 1, wherein a back of the crushing plate is provided with a protrusion, the fineness control mechanism comprises a control plate and a knob, one end of the control plate includes an elliptically shaped hole and an other end includes a protruding portion that engages with the protrusion on the back of the crushing plate, the knob includes a head, a cam-like hard plastic plate, a cylindrical body that is inserted into the elliptically shaped hole of the control plate and a shaft that is offset to the cylindrical body and mounted in a predetermined position on the main body.

6. A spice crusher as claimed in claim 1, wherein the handle is provided with a spring bow and a curved piece to return the handle to its initial position after being moved towards the main body.

7. A spice crusher as claimed in claim 6, wherein a hard plastic plate with a semi-circular wall is provided within the main body and arranged so the spring bow presses against the semi-circular wall.

8. A spice crusher as claimed in claim 7, wherein a bottom of the hard plastic plate is provided with a plurality of protruding portions that are inserted into corresponding accommodating holes in the main body.

9. A spice crusher as claimed in claim 1, wherein a lid is disposed on the top of the main body, the lid has a tail end with a protruding section and swings open when pressure is applied to the protruding section.

10. A peppercorn crusher comprising a main body, a handle pivotally mounted on the main body, a hard plastic plate with a semi-circular wall, a crushing plate, a gear driving mechanism and a fineness control mechanism whereby a lid is disposed on the top of the main body, the handle includes a spring bow and a curved piece, the hard plastic plate is disposed within the main body and the spring bow presses on the semi-circular wall and the crushing plate, the gear driving mechanism and the fineness control mechanism are disposed within the main body and the gear driving mechanism co-operates with the crushing plate and the fineness control mechanism links with the crushing plate.

* * * * *